United States Patent
Shimbo et al.

(10) Patent No.: US 11,611,298 B2
(45) Date of Patent: Mar. 21, 2023

(54) MOTOR DEVICE

(71) Applicant: TDK Corporation, Tokyo (JP)

(72) Inventors: Nobuyuki Shimbo, Tokyo (JP); Koji Mitake, Tokyo (JP)

(73) Assignee: TDK Corporation, Tokyo (JP)

( * ) Notice: Subject to any disclaimer, the term of this patent is extended or adjusted under 35 U.S.C. 154(b) by 11 days.

(21) Appl. No.: 15/931,950

(22) Filed: May 14, 2020

(65) Prior Publication Data

US 2020/0366222 A1 Nov. 19, 2020

(30) Foreign Application Priority Data

May 17, 2019 (JP) .............................. JP2019-094021

(51) Int. Cl.
*H02P 6/10* (2006.01)

(52) U.S. Cl.
CPC .......... *H02P 6/10* (2013.01); *H02P 2207/055* (2013.01)

(58) Field of Classification Search
CPC ................. H02P 6/10; H02P 2207/055; H02K 1/2706; H02K 1/278
USPC ....................................... 318/400.23; 310/43
See application file for complete search history.

(56) References Cited

U.S. PATENT DOCUMENTS

| | | |
|---|---|---|
| 2005/0201129 A1 | 9/2005 | Nakatsugawa et al. |
| 2007/0285044 A1 | 12/2007 | Nakatsugawa et al. |
| 2008/0054736 A1* | 3/2008 | Miyata ................ H01F 41/0293 310/44 |
| 2010/0218365 A1* | 9/2010 | Yamashita ............ H01F 41/028 29/604 |
| 2018/0309330 A1* | 10/2018 | Ueda ....................... H02K 29/03 |
| 2020/0228038 A1 | 7/2020 | Takahashi |
| 2020/0328640 A1* | 10/2020 | Takahashi .............. H02K 7/085 |

FOREIGN PATENT DOCUMENTS

| | | | |
|---|---|---|---|
| JP | 2000-134842 A | | 5/2000 |
| JP | 2000134842 A | * | 5/2000 |
| JP | 2000245084 A | * | 9/2000 |
| JP | 2005-261093 A | | 9/2005 |
| JP | 2015-065803 A | | 4/2015 |
| WO | WO-2019/026979 A1 | | 2/2019 |

* cited by examiner

*Primary Examiner* — Jorge L Carrasquillo (74) *Attorney, Agent, or Firm* — Faegre Drinker Biddle & Reath LLP (57) ABSTRACT

A motor device 100 includes an SPM motor 1 that includes a stator 2 including an iron core 21 and a plurality of windings 23 wound on the iron core 21, and a rotor 3 which is rotatable with respect to a rotation axis and in which a plurality of permanent magnets 33 are mounted along a circumferential direction to form a plurality of magnetic poles in the circumferential direction; and a power supply unit 5 that supplies a current to the plurality of windings 23 of the SPM motor 1. Each of the plurality of magnetic poles is oriented such that directions of axes of easy magnetization are concentrated toward a stator side, and the current supplied from the power supply unit is a trapezoidal wave.

9 Claims, 8 Drawing Sheets

MOTOR DEVICE

TECHNICAL FIELD

The present disclosure relates to a motor device.

BACKGROUND

In the related art, in order to improve torque in a motor using permanent magnets, the orientation of the permanent magnets has been studied (for example, refer to Japanese Unexamined Patent Publication No. 2000-134842).

SUMMARY

However, a further improvement in torque is required.

The present disclosure has been made in light of the foregoing circumstances, and an object of the present disclosure is to provide a motor device of which the torque can be improved without changing the configuration of a rotor.

In order to achieve the foregoing object, according to one aspect of the present disclosure, there is provided a motor device including a motor that includes a stator including an iron core and a plurality of windings wound on the iron core, and a rotor which is rotatable with respect to a rotation axis and in which a plurality of permanent magnets are mounted along a circumferential direction to form a plurality of magnetic poles in the circumferential direction; and a power supply unit that supplies a current to the plurality of windings of the motor, in which each of the plurality of magnetic poles is oriented such that directions of axes of easy magnetization are concentrated toward a stator side, and the current supplied from the power supply unit is a trapezoidal wave.

In the motor device, each of the plurality of magnetic poles is oriented such that the directions of axes of easy magnetization are concentrated toward the stator side, and the current supplied from the power supply unit is a trapezoidal wave; and thereby, a torque output from the motor can be improved. Since the waveform of the current has a trapezoidal shape, it is possible to reduce a minus torque occurring due to end portions of the magnetic poles, which have a so-called concentrated orientation where the directions of axes of easy magnetization are concentrated toward the stator side, along a rotational direction of the rotor and the current which is supplied from the power supply unit to the windings. As a result, it is possible to improve the torque output from the motor without changing the configuration of the rotor.

Here, according to this aspect, the current can have a positive current phase angle.

Since the phase angle of the current supplied from the power supply unit is positive, an interaction between the magnetic poles having a concentrated orientation and a magnetic field occurring in the iron core due to the current which is supplied from the power supply unit to the windings works to increase the torque; and thereby, the torque can be further improved.

In addition, according to this aspect, a position where the directions of axes of easy magnetization in the magnetic pole are concentrated can be provided rearward of a central portion of the magnetic pole along a rotational direction of the rotor.

When the position where the directions of axes of easy magnetization of the magnetic pole are concentrated is provided rearward of the central portion of the magnetic pole along the rotational direction of the rotor, the occurrence of the minus torque by an end portion on a rear side of the magnetic pole along the rotational direction and the windings to which the current is supplied from the power supply unit can be further prevented. Therefore, the torque can be further improved.

In addition, according to this aspect, the trapezoidal wave can have a de-energized period where substantially no current flows.

Since the trapezoidal wave is configured to have the de-energized period, the occurrence of the minus torque by the end portion on the rear side of the magnetic pole along the rotational direction and the current which is supplied from the power supply unit to the windings can be prevented. For this reason, the torque can be further improved.

The present disclosure provides the motor device of which the torque can be improved without changing the configuration of the rotor.

DETAILED DESCRIPTION

Hereinafter, an embodiment of the present disclosure will be described in detail with reference to the accompanying drawings. Incidentally, in the description of the drawings, the same reference signs are assigned to the same elements, and duplicated descriptions will be omitted.

Figure 1:
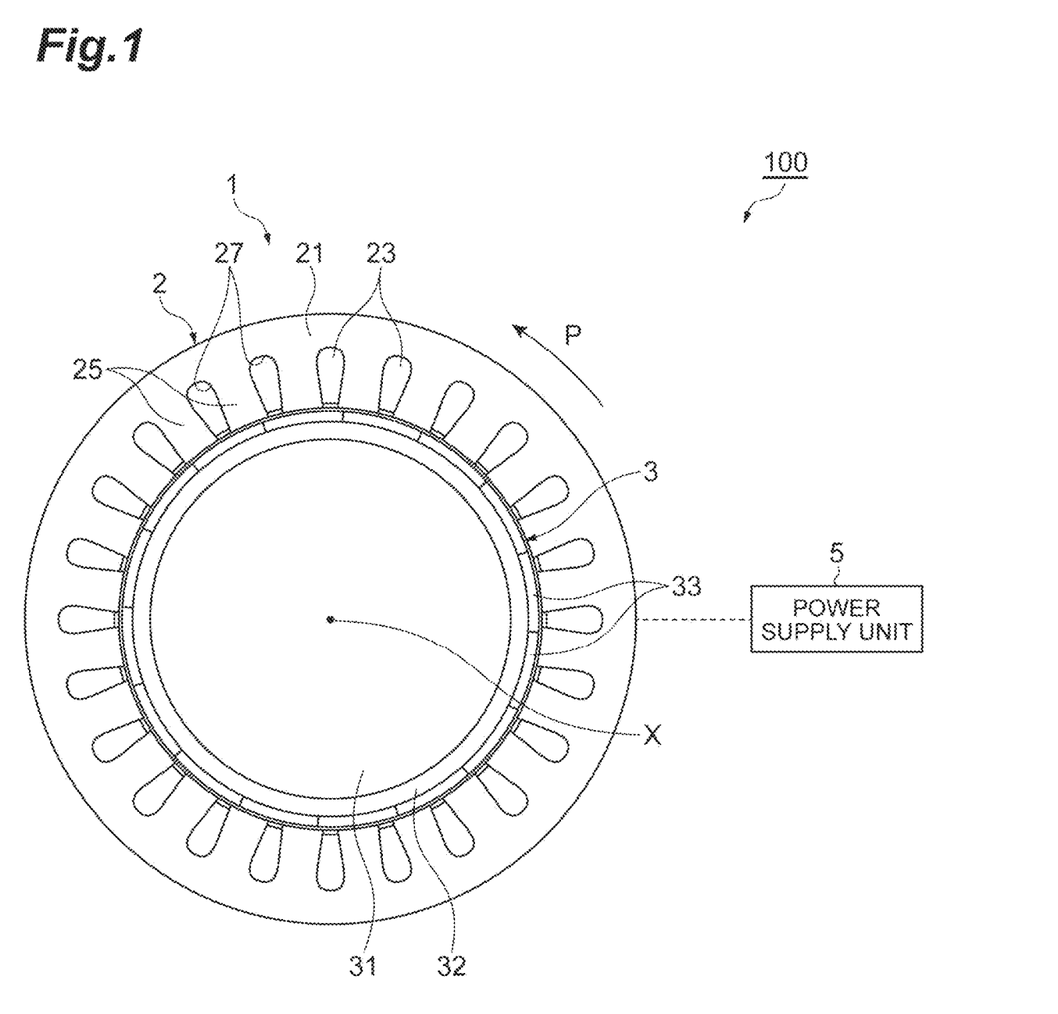
FIG. 1 is a schematic configuration view of a motor device according to one embodiment.
Figure 2:
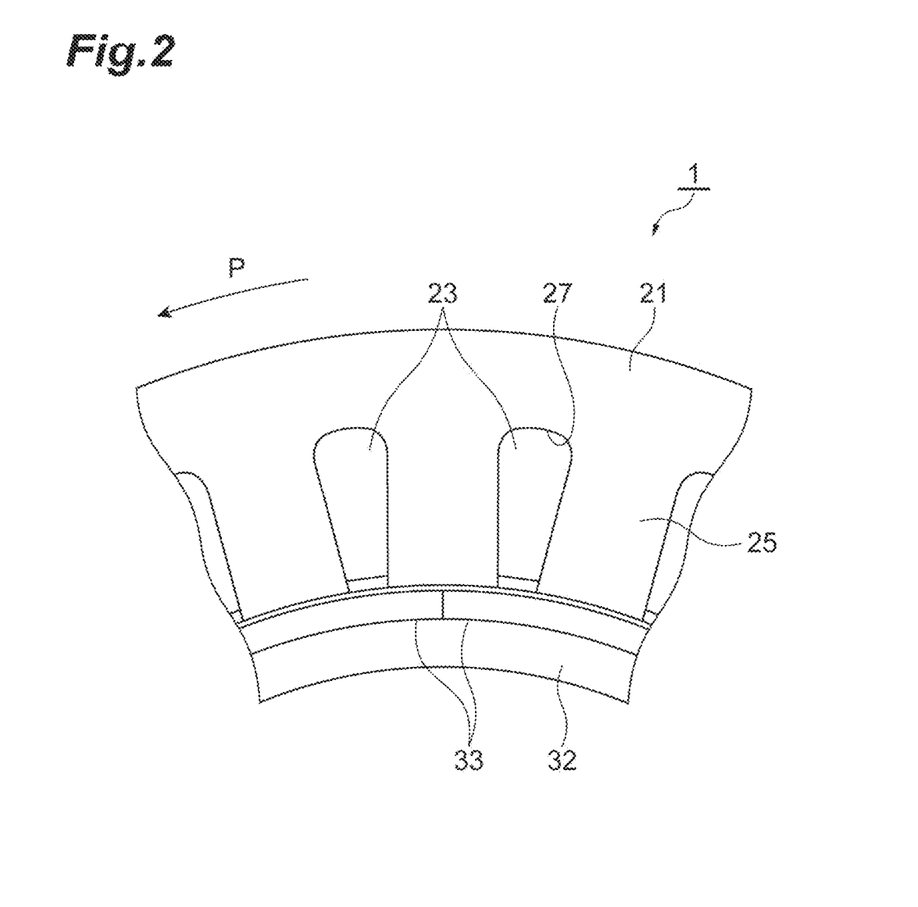
FIG. 2 is a partial enlarged view of an SPM motor included in the motor device.

FIG. 1 is a schematic configuration view of a motor device according to one embodiment of the present disclosure. In addition, FIG. 2 is a partial enlarged view of an SPM motor (motor) included in the motor device illustrated in FIG. 1. As illustrated in FIG. 1, a motor device 100 includes an SPM motor 1 and a power supply unit 5. The SPM motor 1 includes a stator 2 and a rotor 3 that is rotatably disposed inside the stator 2.

The stator 2 includes an iron core 21 and a plurality of windings 23 that are wound on the iron core 21. The iron core 21 includes a plurality of teeth 25. In addition, the windings 23 are provided in a slot 27 between the teeth 25 adjacent to each other in the stator 2. A predetermined number of the windings 23 are disposed at predetermined intervals to pass through the slots 27, and the windings 23 are energized to generate a rotating magnetic field for rotating the rotor 3. In addition, the rotor 3 includes a shaft 31, a core 32 (back yoke) made of an electromagnetic steel sheet or the like which is disposed around the shaft 31, and permanent magnets 33 that are provided on an outer periphery side of the core 32.

The power supply unit 5 has the function of causing a three-phase alternating current to flow to the plurality of windings 23 of the stator 2. When the power supply unit 5 causes a three-phase alternating current to flow to the plurality of windings 23, a rotating magnetic field for rotating the rotor 3 is formed. Due to the rotating magnetic field, the rotor 3 is rotatable around an axis X which is a rotation axis, for example, in a rotational direction (counterclockwise) indicated by an arrow P.

The SPM motor 1 illustrated in FIG. 1 includes the stator 2 including twenty four slots 27. The windings 23 are wound ninety turns through the twenty four slots 27 in a concentrated winding manner. The windings 23 are electrically connected to each other in a predetermined order, and are also electrically connected to the power supply unit 5. The rotor 3 of the SPM motor 1 has eight pairs of magnetic poles indicating N poles or S poles, owing to sixteen permanent magnets 33. Namely, one permanent magnet 33 forms one magnetic pole. As described above, the SPM motor 1 is a 16-pole 24-slot inner rotor-type SPM motor.

Figure 3:
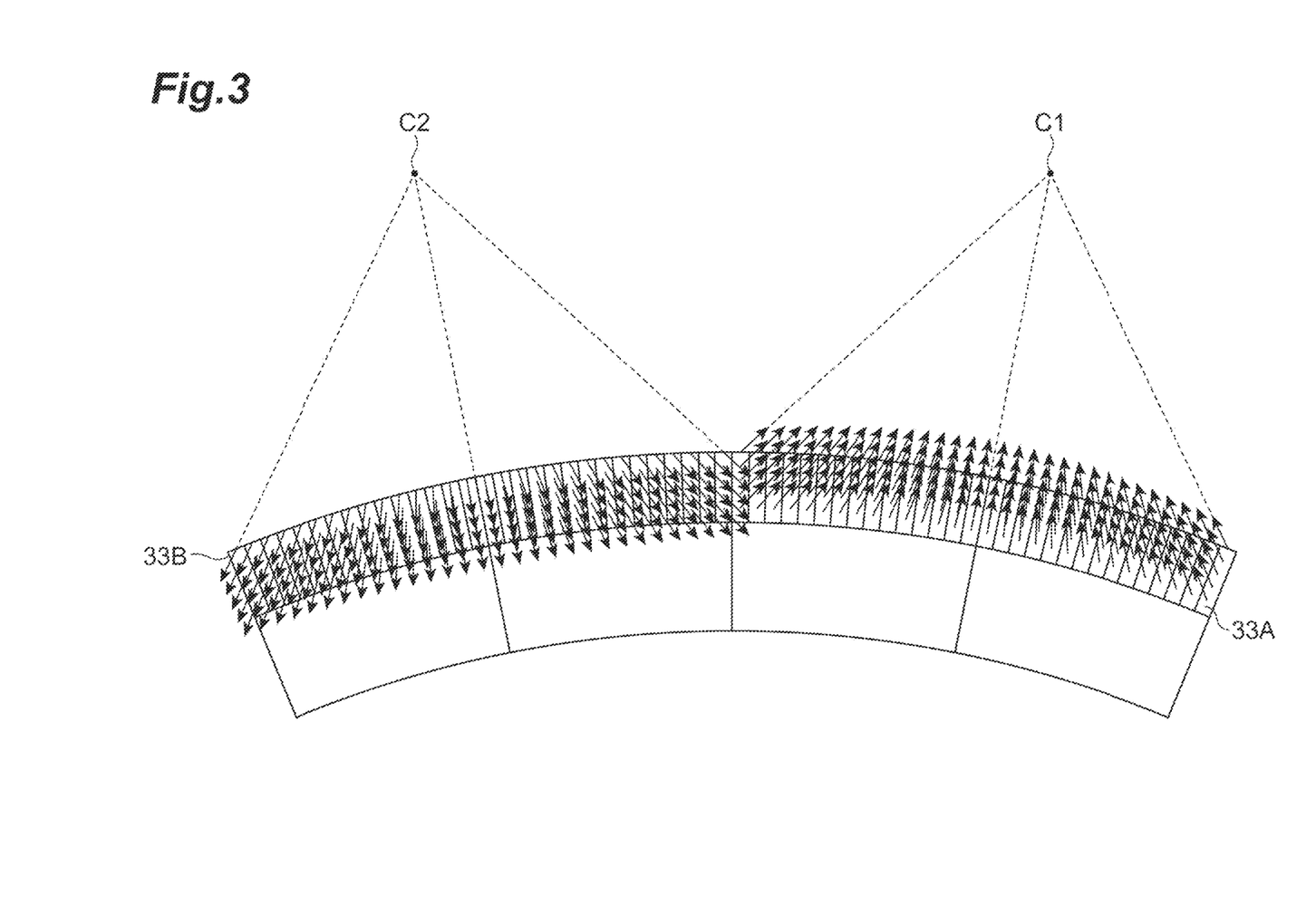
FIG. 3 is a view describing the orientation (concentrated orientation) of permanent magnets.

FIG. 3 illustrates a part of a plurality of the permanent magnets 33 (two permanent magnets 33 adjacent to each other) included in the SPM motor 1.

Firstly, the material of the permanent magnet 33 will be described. The plurality of permanent magnets 33 may be permanent magnets made of the same material, or may be permanent magnets made of different materials. Specifically, each of the permanent magnets 33 can be a ferrite magnet, a rare earth magnet, an alloy magnet, or the like. However, the types of the material of the permanent magnet 33 are not limited to the foregoing types. In addition, a method for producing the permanent magnet is not specifically limited, and the permanent magnet may be produced by sintering, or may be produced by performing hot forming or hot working.

The orientation of the permanent magnets 33 is a so-called concentrated orientation. This point will be described with reference to FIG. 3. FIG. 3 illustrates two permanent magnets 33A and 33B of the plurality of permanent magnets 33. The permanent magnet 33A is a magnet in which the outside (working surface side) of the rotor is an N pole, and the permanent magnet 33B is a magnet in which the outside (working surface side) of the rotor is an S pole. The permanent magnet 33A is oriented such that the directions of axes of easy magnetization are concentrated toward a specific point C1 of concentration. The point C1 of concentration is located at the center of the permanent magnet 33A in a circumferential direction of the permanent magnet 33A and at a position (outside) which is further spaced apart from the axis X (refer to FIG. 1) of the rotor 3 than the permanent magnet 33A, namely, on a stator 2 side (working surface side). In addition, the permanent magnet 33B is oriented such that the directions of axes of easy magnetization are concentrated toward a specific point C2 of concentration. The point C2 of concentration is located at the center of the permanent magnet 33B in a circumferential direction of the permanent magnet 33B and at a position (outside) which is further spaced apart from the axis X (refer to FIG. 1) of the rotor 3 than the permanent magnet 33B, namely, on the stator 2 side (working surface side). FIG. 3 illustrates only two permanent magnets 33A and 33B; however, all of the permanent magnets 33 used in the SPM motor 1 are oriented such that the directions of axes of easy magnetization are concentrated toward specific points of concentration.

Figure 4:
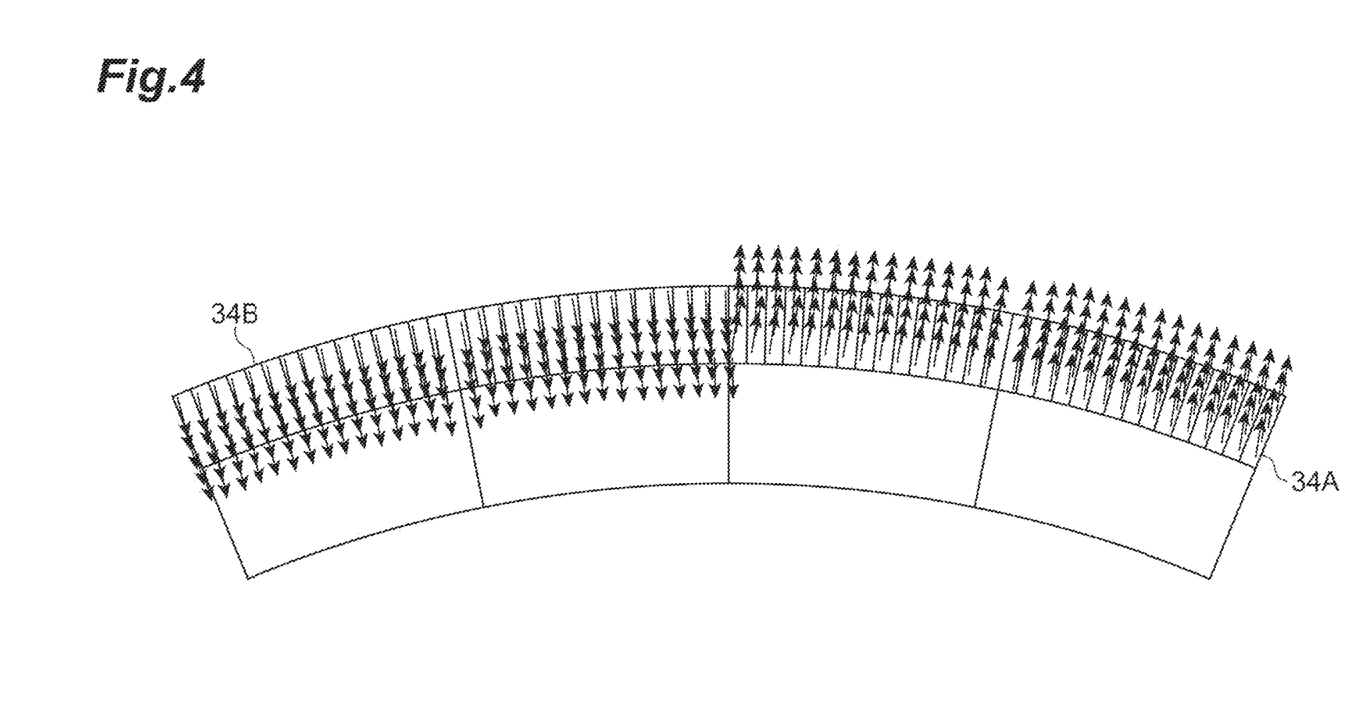
FIG. 4 is a view describing the orientation (parallel orientation) of permanent magnets.

FIG. 4 illustrates permanent magnets 34A and 34B that are generally used in a rotor. The permanent magnets 34A and 34B are magnets corresponding to the permanent magnets 33A and 33B, and have a so-called parallel orientation where the directions of axes of easy magnetization are uniformly parallel to a specific direction. Each of the permanent magnets 34A and 34B is in a state where the directions of axes of easy magnetization are aligned parallel to a center line of the arced shape of the magnet. Generally, a permanent magnet used in a rotor has an orientation parallel to a center line of the shape of the magnet as with the permanent magnets 34A and 34B illustrated in FIG. 4, or has a so-called radial orientation where the directions of axes of easy magnetization are radially orientated with respect to the axis of the rotor. When a magnet has an arced shape as with the permanent magnets 34A and 34B, the magnet can be referred to as having a radial orientation where the directions of axes of easy magnetization are radially aligned from the center of the circular arc of an outer peripheral surface, an inner peripheral surface, or the like of the magnet. In contrast, the permanent magnets 33 (33A and 33B) according to this embodiment are oriented such that the directions of axes of easy magnetization are concentrated toward the stator 2 side (working surface side) (concentrated orientation), and thus the torque is improved.

FIG. 3 illustrates a state where the directions of axes of easy magnetization of the permanent magnets 33A and 33B are concentrated toward the specific points C1 and C2 of concentration. However, the configuration where each of a plurality of the magnetic poles provided in the rotor 3 of the motor device 100 according to this embodiment "is oriented such that the directions of axes of easy magnetization are concentrated toward the stator 2 side (work surface side)" is not limited to a configuration where the directions of axes of easy magnetization are concentrated toward one point. Namely, the point where the directions of axes of easy magnetization are concentrated may not be one point, and the directions of axes of easy magnetization may be concentrated toward a plurality of points. In addition, there may be a case where the directions of axes of easy magnetization are concentrated toward a certain size of region. In any one of the states, it can be said that the magnetic poles "are oriented such that the directions of axes of easy magnetization are concentrated toward the stator 2 side (working surface side)". In addition, when a magnet has an arced shape as with the permanent magnet 33, the directions of axes of easy magnetization are concentrated toward the foregoing point of concentration in the vicinity of the center along the circumferential direction; however, as the directions of axes of easy magnetization are separated toward an end portion in the circumferential direction, the directions of axes of easy magnetization are gradually changed from the direction toward the point of concentration. Also in such a case, it is said that the magnet has "an orientation where the directions of axes of easy magnetization are concentrated toward the stator 2 side (working surface side)". As described above, "the orientation where the directions of axes of easy magnetization are concentrated toward the stator 2 side (working surface side)" is not limited to the orientation illustrated in FIG. 3.

Figure 5:
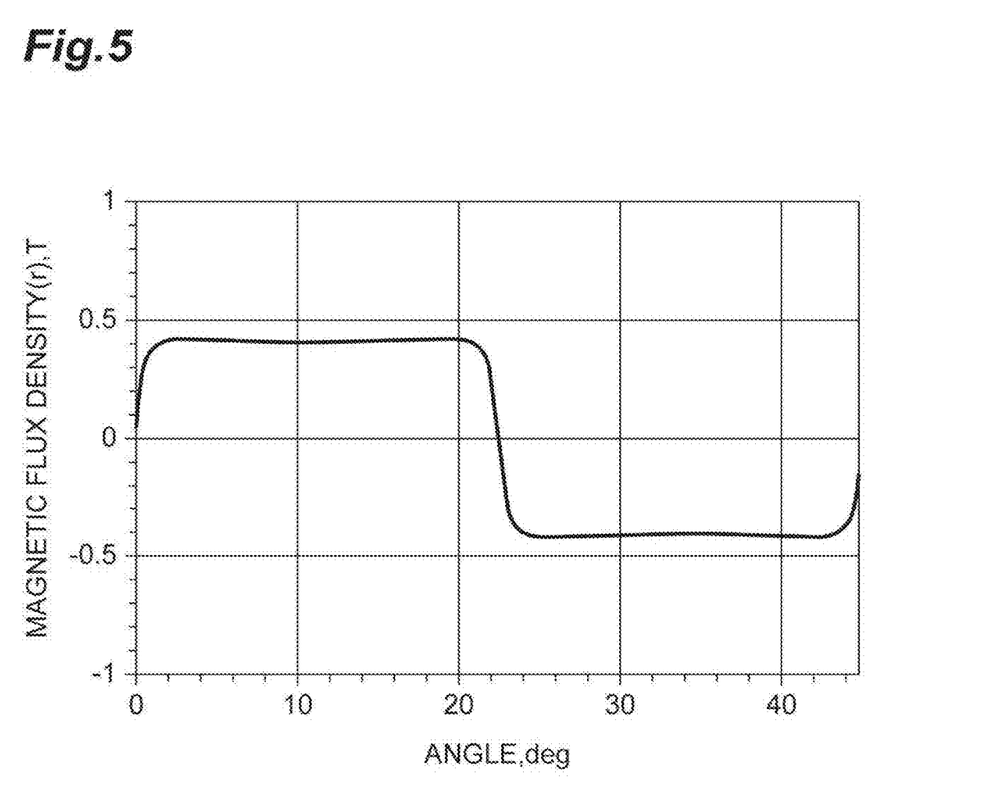
FIG. 5 is a graph describing a surface magnetic flux density in a permanent magnet.

FIG. 5 shows the distribution (simulation result) of a magnetic flux density in the surfaces (surfaces on the stator 2 side) of the permanent magnets 33A and 33B. As shown in FIG. 5, in both of the permanent magnets 33A and 33B, the surface magnetic flux densities are substantially constant irrespective of locations except for end portions of the permanent magnets. Incidentally, in this embodiment, a case where the surface magnetic flux densities of the permanent magnets 33A and 33B are substantially constant has been described; and the distribution of the magnetic flux density is merely one example. Namely, the distribution of the surface magnetic flux density may be constant irrespective of locations in the permanent magnet, or, for example, control may be performed such that the magnetic flux density at the center in the circumferential direction is maximum. In addition, control may be performed such that the magnetic flux density in the vicinity of the center in the circumferential direction is smaller than those of both end portions. As described above, it is possible to appropriately change the distribution of the surface magnetic flux density in each of the permanent magnets 33A and 33B.

A method for magnetizing (magnetization) the permanent magnet 33 is not particularly limited, and a known method can be used.

Figure 6:
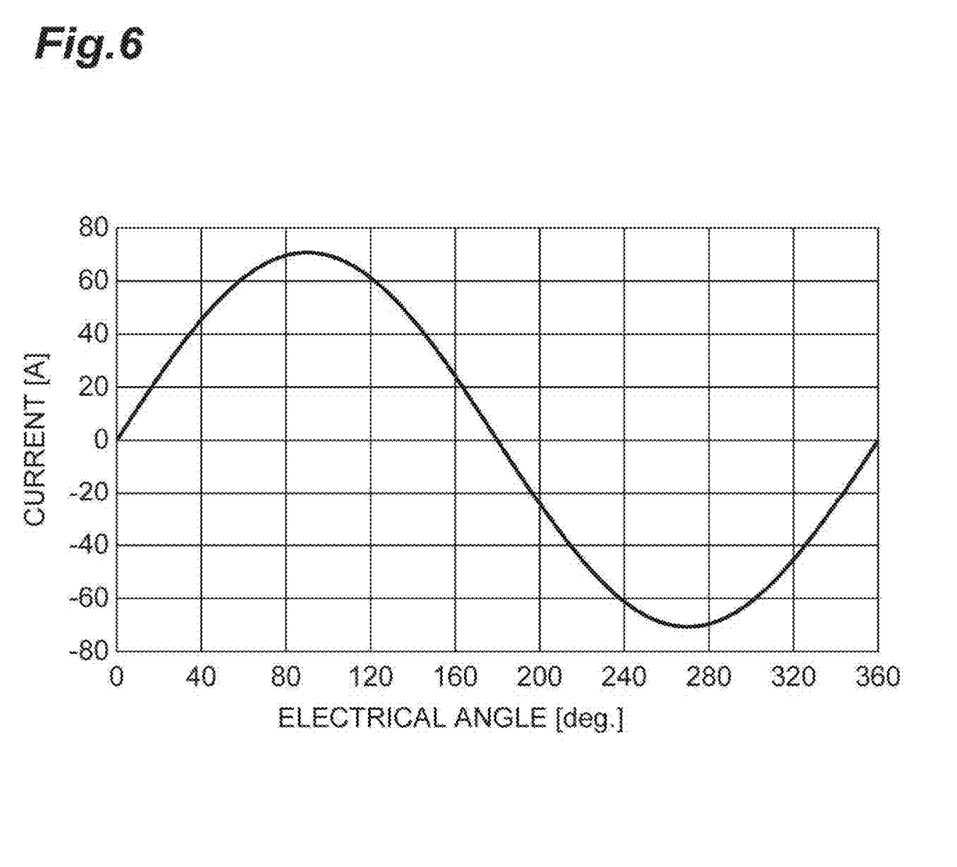
FIG. 6 is a graph describing the waveform (sinusoidal wave) of a current from a power supply unit.

Subsequently, a current supplied from the power supply unit 5 will be described. As described above, the power supply unit 5 causes a three-phase alternating current, of which the electrical angle has a phase offset of 120°, to flow to the plurality of windings 23, so that a rotating magnetic field is formed. In the motor device 100 illustrated in FIG. 1, an alternating current of which one period (electrical angle of) 360° is equivalent to a mechanical angle 45° is sent from the power supply unit 5 to the windings 23 of the SPM motor 1. FIG. 6 shows the waveform of a single-phase alternating current of an alternating current with a sinusoidal wave which is one type of current waveform used in the operation of a general motor. The general motor uses an alternating current that is a combination of currents having the waveform of the sinusoidal wave shown in FIG. 6, or an alternating current that is a combination of currents having the waveform of a rectangular wave (pseudo-sinusoidal wave) instead of a sinusoidal wave. The rectangular wave used instead of the sinusoidal wave is, for example, a rectangular wave current having an electrical angle of 120°. A state where a predetermined amount of current flows in an electrical angle range of 120° and substantially no current flows (de-energization) in an electrical angle range of 60° is repeated, so that an alternating current similar to the sinusoidal wave is formed.

Figure 7:
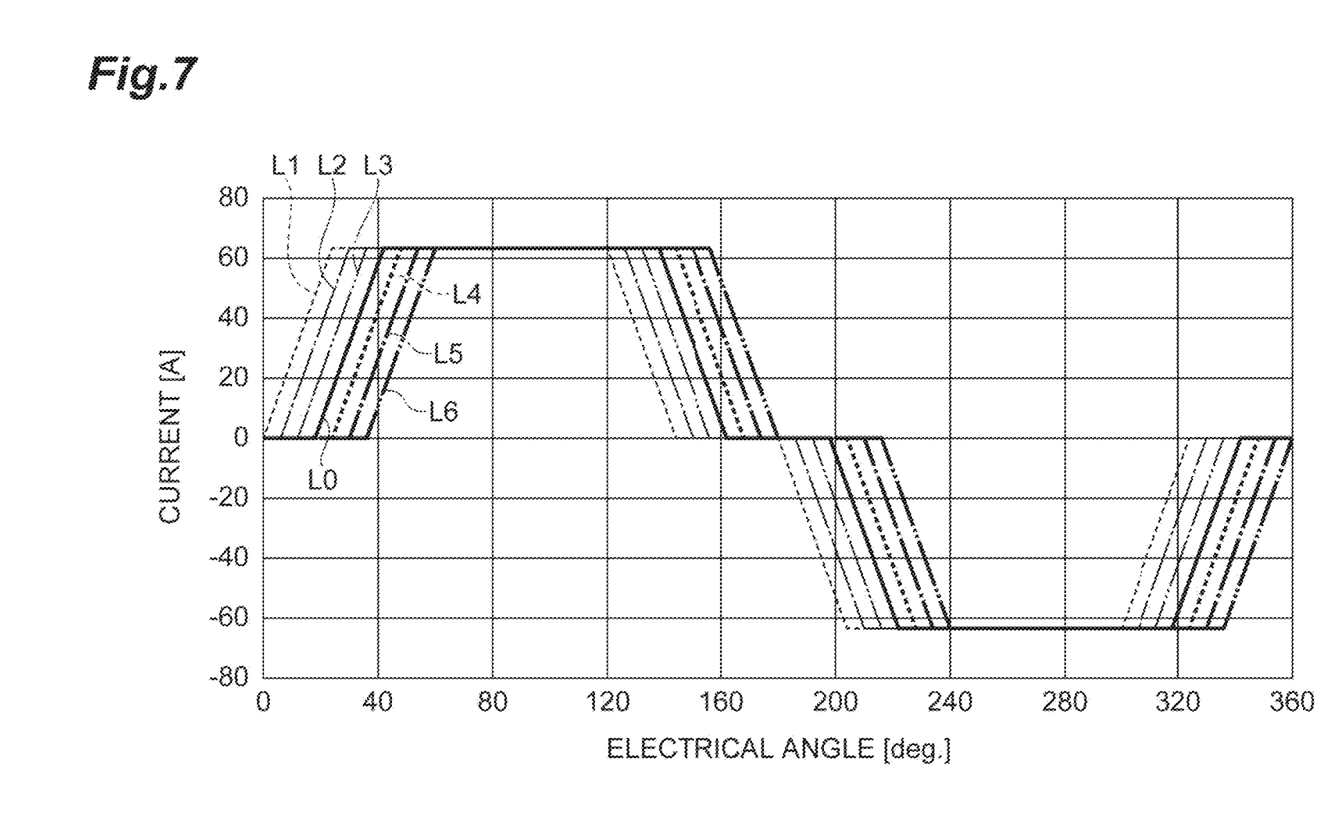
FIG. 7 is a graph describing the waveform (trapezoidal wave) of a current from the power supply unit.

In the motor device 100 according to this embodiment, a current having the waveform of a trapezoidal wave is supplied from the power supply unit 5 to the windings 23 of the stator 2 of the SPM motor 1. FIG. 7 shows the current waveforms of seven trapezoidal waves. A trapezoidal wave L0 in FIG. 7 is a trapezoidal wave corresponding to the waveform of the sinusoidal wave shown in FIG. 6. In the case of the trapezoidal wave L0, a current flows to the windings 23 for a longer period (for example, within an electrical angle range of 144° in the example shown in FIG. 7) than that in the rectangular wave. In addition, the period where substantially no current flows (de-energized period) corresponds to an electrical angle range of 36°. The state where substantially no current flow refers to a state where the flowing current is zero or sufficiently small and there is no occurrence of a substantial state change caused by the current such as a change in magnetic field. However, an electrical angle range of 144° includes a period where the current rises from no current flow state (0 A) to a predetermined current value (rising period) and a period where the current falls from the predetermined current value to no current flow state (0 A) (falling period). Namely, in the case of the trapezoidal wave, an electrical angle range of 144° includes a period where the absolute value of the current value increases gradually (rising period), a period where the current value is a constant value, and a period where the current value decreases gradually (falling period). In the case of the trapezoidal wave L0, the rising period and the falling period is an electrical angle range of 24°. The amount of change in current per unit angle is constant in the rising period and the falling period. As described above, unlike the rectangular wave, the trapezoidal wave L0 has the rising period and the falling period.

In the motor device 100, a three-phase alternating current having a waveform corresponding to the trapezoidal wave L0 is supplied from the power supply unit 5 to the windings 23 of the SPM motor 1, so that the rotor 3 rotates with respect to the stator 2.

In the motor device 100 according to this embodiment, as described above, a current having a trapezoidal waveform having the unevenness of the trapezoidal shape flows from the power supply unit 5 to the SPM motor 1 that includes the rotor 3 including the permanent magnets 33 which are oriented such that the directions of axes of easy magnetization are concentrated toward the stator 2 side (working surface side). Accordingly, the rotor 3 rotates with respect to the stator 2 of the SPM motor 1.

As described above, when a current having a trapezoidal waveform flows to the SPM motor 1 including the rotor 3 in which the permanent magnets 33 having a concentrated orientation are mounted, the output torque can be further improved than that of a motor in the related art.

It is known that in the related art, the orientation of permanent magnets used in a rotor of a SPM motor is a parallel orientation or a radial orientation. In contrast, it is known that when the orientation is made such that the directions of axes of easy magnetization are concentrated (concentrated orientation), the output torque is improved. On the other hand, it is known that the sinusoidal wave or the rectangular wave is used as the waveform of a current with which windings provided in a stator of the SPM motor are energized. It is also known that when the rectangular wave is selected as the waveform of the current, the torque is further improved than that when the sinusoidal wave is selected. Therefore, it is considered that when a current with a rectangular wave energizes the windings of the SPM motor in which the permanent magnets which are oriented such that the directions of axes of easy magnetization are concentrated (concentrated orientation) are mounted in the rotor, the output torque is improved.

In contrast, in the motor device 100 according to this embodiment, since the waveform of a current which energizes the windings 23 of the SPM motor 1 including the permanent magnets 33 which are oriented such that the directions of axes of easy magnetization are concentrated toward the stator 2 side (working surface side) is a trapezoidal wave, the output torque is further improved. The reason is considered to be that unlike the current with a rectangular wave, the current with a trapezoidal wave has the rising period and the falling period where the current value is gradually changed. It is considered that in the rising period and the falling period, the occurrence of a minus torque by the current supplied to the windings 23 and the permanent magnets 33 can be prevented, and as a result, the torque output from the SPM motor 1 can be improved. In particular, since the trapezoidal wave is adopted such that a change in current in the period where the minus torque can occur falls, the minus torque can be reduced; and thereby, the output torque of the SPM motor 1 can be increased.

The results of performing simulations on the foregoing points will be described below.

Firstly, when the SPM motor 1 (however, the shaft 31 was not included) illustrated in FIG. 1 was used as a model and the waveform of a current with which the windings 23 were energized was changed, the output torque was calculated by a simulation using analysis software. Table 1 shows specifications including analysis conditions and the like. JMAG- Designer Ver. 17.1 (manufactured by JSOL Corporation) was used as the analysis software.

TABLE 1

| Item | | | Conditions |
|---|---|---|---|
| Structure of motor | Rotor | Outer diameter/inner diameter | 185 mm/160 mm |
| | | Accumulated thickness | 47.6 mm |
| | | Material of core | Electromagnetic steel sheet |
| | | Number of poles | 16 |
| | | Material of magnet | Neodymium magnet |
| | | Shape | Arced shape |
| | | Dimensions of magnet | Outer radius 92.5 mm/inner radius 87.5 mm/thickness 5 mm |
| | Stator | Outer diameter/inner diameter | 270 mm/186.6 mm |
| | | Gap | 0.8 mm |
| | | Width of tooth | 18 mm |
| | | Number of slots | 24 |
| | | Phase | 3 |
| | | Number of turns of winding | 90 turns/phase/slot |
| | | Winding method | Concentrated winding |
| Analysis conditions | | Analysis dimension | Two-dimension |
| | | Current value | 50 Arms |
| | | Phase angle β | 30° |
| | | Periodic boundary condition | 45°/period |
| | | Rotational speed | 1500 rpm |
| | | Rotational direction | CCW |
| | | Analysis pitch | Appropriately set |

When three-phase alternating currents having three different types of waveforms flowed from the power supply unit 5 to the SPM motor 1 having the foregoing structure, the output torque (average torque: unit N·m) was calculated. The three types of waveforms are a sinusoidal wave, a rectangular wave, and a trapezoidal wave (corresponding to the trapezoidal wave L0 shown in FIG. 7). Table 2 shows the results of calculation of the output torque. Table 2 shows the results of performing evaluations when the orientation of the permanent magnets mounted in the SPM motor 1 is a parallel orientation (refer to FIG. 4), when the orientation is a radial orientation, and when the orientation is a concentrated orientation (refer to FIG. 3).

TABLE 2

| Waveform | Parallel orientation | Radial orientation | Concentrated orientation |
|---|---|---|---|
| Sinusoidal wave | 484 | 464 | 515 |
| Rectangular wave | 489 | 472 | 509 |
| Trapezoidal wave | 494 | 475 | 518 |

As described above, in the motor device 100 according to this embodiment, each of the plurality of magnetic poles is oriented such that the directions of axes of easy magnetization are concentrated toward the stator side (working surface side) outside the magnetic pole, and the waveform of the current supplied from the power supply unit is a trapezoidal wave; and thereby, the torque output from the motor can be improved. Since the waveform of the current has a trapezoidal shape, it is possible to reduce the minus torque occurring due to the end portions of the magnetic poles, which have a so-called concentrated orientation, along the rotational direction of the rotor 3 and the current which is supplied from the power supply unit 5 to the windings 23. As a result, it is possible to improve the torque output from the motor without changing the configuration of the rotor 3. Incidentally, in the SPM motor 1 of the motor device 100, since one permanent magnet 33 forms one magnetic pole, the occurrence of the minus torque by the end portions of the one permanent magnet 33 along the rotational direction and the current can be prevented; and thereby, it is possible to improve the output torque from the SPM motor 1 without changing the configuration of the rotor 3.

As described above, since the trapezoidal wave is configured to have the de-energized period, the occurrence of an unnecessary torque is prevented by an interaction between the magnetic poles having a concentrated orientation and a magnetic field occurring in the iron core due to the current which is supplied from the power supply unit to the windings. For this reason, the torque can be further improved.

In the embodiment, a case where the current supplied from the power supply unit 5 is the trapezoidal wave L0 (refer to FIG. 7) has been described. The trapezoidal wave L0 corresponds to a wave having a current phase angle of 0°. In contrast, in the current with a trapezoidal wave supplied from the power supply unit 5, the current having a changed current phase angle can be supplied to the SPM motor 1. When a trapezoidal wave having a positive current phase angle among trapezoidal waves is supplied to the windings 23 of the SPM motor 1, the occurrence of the foregoing minus torque can be further prevented; and thereby, the output torque can be improved.

FIG. 7 shows three types of trapezoidal waves L1 to L3 having a positive current phase angle and three types of trapezoidal waves L4 to L6 having a negative current phase angle, in addition to the trapezoidal wave L0 having a current phase angle of 0°. The current phase angles of the trapezoidal waves L1 to L3 are +18°, +12°, and +6° (in electrical angle), respectively. In addition, the current phase angles of the trapezoidal waves L4 to L6 are −6°, −12°, and −18° (in electrical angle), respectively. Table 3 shows the results of calculation of the output torque (average torque: unit N·m) when the trapezoidal wave L0 and the trapezoidal waves L1 to L6 described above are supplied from the power supply unit 5 to the SPM motor 1. Incidentally, L0 and L1 to L6 in Table 3 correspond to the trapezoidal waves L0 to L6 shown in FIG. 7. Incidentally, Table 3 also shows the results for the cases of a parallel orientation and a radial orientation as reference, in addition to the results when the permanent magnets have a concentrated orientation.

TABLE 3

| Trapezoidal wave | | L1 | L2 | L3 | L0 | L4 | L5 | L6 |
|---|---|---|---|---|---|---|---|---|
| Current phase angle (°) | | +18 | +12 | +6 | 0 | −6 | −12 | −18 |
| Output torque | Concentrated | 515 | 523 | 524 | 518 | 505 | 488 | 465 |
| | Parallel | 501 | 507 | 504 | 494 | 477 | 455 | 429 |
| | Radial | 483 | 489 | 486 | 475 | 458 | 437 | 411 |

From the results shown in Table 3, it was confirmed that when the current phase angle was set to a positive value, the output torque could be further increased. The reason is considered to be that since the period where the current flows can be brought forward by setting the current phase angle to a positive value, a reverse torque (minus torque) of the SPM motor 1 can be effectively prevented from occurring in the falling period.

As described above, since the phase angle of the current supplied from the power supply unit 5 is positive, the occurrence of the minus torque by an end portion on a rear side of the magnetic pole along the rotational direction and the current which is supplied from the power supply unit 5 to the windings 23 can be further prevented. Therefore, the output torque from the SPM motor 1 can be further improved.

According to the results of Table 3, it is possible to further increase the output torque when the current phase angle is set to +12°. However, it is considered that a relationship between the current phase angle and the output torque is also changed by the configuration (in particular, a relationship between the number of the magnetic poles and the number of the slots or the like) of the motor.

In the embodiment, a case where the point of concentration of the magnetic pole is provided at the center of the magnetic pole (permanent magnet 33) in the circumferential direction has been described; however, the point of concentration may be moved along the circumferential direction. In this case, when the position where the directions of axes of easy magnetization are concentrated is moved rearward of a central portion of the magnetic pole with respect to the rotational direction (direction indicated by the arrow P) of the rotor 3, the output torque from the SPM motor 1 can be further improved.

Figure 8:
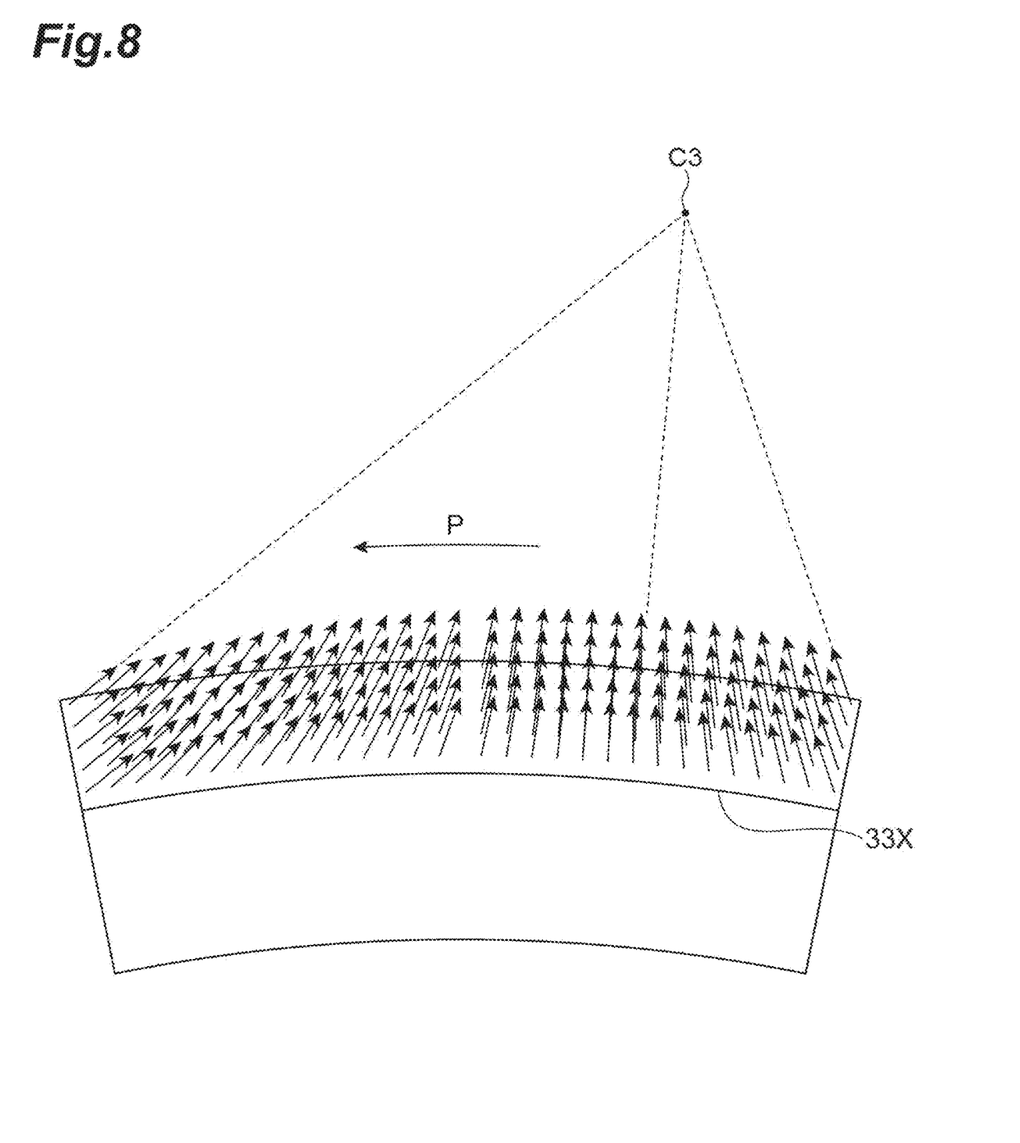
FIG. 8 is a view describing a modification example of the orientation of a permanent magnet.

FIG. 8 illustrates a permanent magnet 33X where a point C3 of concentration is provided rearward with respect to the rotational direction (direction indicated by the arrow P) and the directions of axes of easy magnetization are concentrated toward the point C3 of concentration. In the permanent magnet 33X illustrated in FIG. 8, the point C3 of concentration is provided in the vicinity of a position that is located one-third the length of the permanent magnet 33X from a rear end of the permanent magnet 33X along the rotational direction (position that is moved 3.75° rearward from a central portion with respect to the fact that the angle of the permanent magnet 33X is 22.5° in mechanical angle). When a magnetic pole is formed by one magnet as with the permanent magnet 33X, a central portion of the magnetic pole along the rotational direction is a substantially central portion of the external form of the permanent magnet 33X, and a position rearward of the central portion is a position offset from substantially the center of the external form. When the point C3 of concentration corresponding to the position where the directions of axes of easy magnetization are concentrated is moved rearward from the center, as illustrated in FIG. 8, the orientation formed in the permanent magnet 33X is not symmetric with respect to the center along the rotational direction but is an asymmetric orientation in a forward and rearward direction. Since the permanent magnet 33X having the foregoing orientation is used in the rotor 3 of the SPM motor 1, the occurrence of the minus torque by an end portion on a rear side of the magnetic pole along the rotational direction and the current which is supplied from the power supply unit 5 to the windings 23 can be further prevented. Therefore, the output torque from the SPM motor 1 can be further improved. Incidentally, similar to the permanent magnets 33A and 33B described in the embodiment, the magnet may have an "orientation where the directions of axes of easy magnetization are concentrated toward the stator 2 side (working surface side)", and the directions of axes of easy magnetization may not be concentrated toward one point.

Table 4 shows the results of calculation of the output torque (average torque and unit: N·m) when a current is supplied from the power supply unit 5 to the SPM motor 1 in which permanent magnets of which the directions of axes of easy magnetization are concentrated toward different positions are mounted. In the results shown in Table 4, the term "center" indicates the result when permanent magnets having the orientation illustrated in FIG. 3 are mounted, and the term "rear" indicates the result when permanent magnets having the orientation illustrated in FIG. 8 are mounted.

TABLE 4

| Point of concentration | Center | Rear |
|---|---|---|
| Output torque | 518 | 519 |

As shown in Table 4, it was confirmed that when the position where the directions of axes of easy magnetization were concentrated was moved rearward, the output torque could be improved. Incidentally, the position of the point of concentration is not limited to the position indicated by the point C3 of concentration illustrated in FIG. 8, and may be further moved forward and rearward along the rotational direction. Incidentally, in a case where the angle of the permanent magnet 33X is 22.5° in mechanical angle, when the point C3 of concentration is set in the vicinity of the foregoing position, the effect of improving the output torque is enhanced.

The present disclosure is not limited to the embodiment, and various changes can be made without departing from the concept of the present disclosure.

For example, in the embodiment, the SPM motor 1 has been described; however, the type of the motor is not particularly limited, and the motor may be, for example, an IPM motor in which permanent magnets are inserted into magnet insertion holes provided in a rotor. In addition, the number of permanent magnets forming one magnetic pole is not limited to one. For example, there may be a case where a plurality of permanent magnets disposed along a circumferential direction form one magnetic pole. Also in that case, it is possible to obtain the effects described in the embodiment by controlling the orientation of each of the plurality of permanent magnets, namely, as described above, by orienting one magnetic pole such that the directions of axes of easy magnetization are concentrated. In addition, in the embodiment, the configuration where the permanent magnet 33 having an arced shape is used has been described; however, the shape of the permanent magnet is not particularly limited. For example, even when a permanent magnet having a flat plate shape is used, it is possible to realize an orientation where the directions of axes of easy magnetization are concentrated.

When a magnetic pole is oriented such that the directions of axes of easy magnetization are concentrated toward a stator side (working surface side), it is possible to appropriately change the direction where the directions of axes of easy magnetization are concentrated. In the embodiment, a case where the location where the directions of axes of easy magnetization are concentrated is positioned in the central portion or at the rear along the rotational direction (circumferential direction) has been described; however, the location may be positioned at the front. In addition, the location (equivalent to the point of concentration) where the axes of easy magnetization are concentrated is positioned outside the permanent magnet with respect to the axis X; however, it is possible to appropriately change the position (distance from the axis) of the location.

It is possible to appropriately change the shape of the trapezoidal wave. The length of each of the rising period and the falling period described in the embodiment is merely one example, and is not limited thereto. In addition, it is possible to appropriately change the amount of change in current in the rising period and the falling period. In addition, it is also possible to appropriately change the length of the de-energized period.

The number, the disposition, the shape, and the like of the magnetic poles provided in the rotor are not limited to those in the embodiment. Similarly, it is also possible to appropriately change the shape of the iron core, the number of the windings, the number of turns, and the like which form the stator.

What is claimed is:

1. A motor device comprising:
   a motor that includes a stator including an iron core and a plurality of windings wound on the iron core, and a rotor which is rotatable with respect to a rotation axis and in which a plurality of permanent magnets are mounted along a circumferential direction to form a plurality of magnetic poles in the circumferential direction; and
   a power supply unit that supplies a current to the plurality of windings of the motor,
   wherein each of the plurality of magnetic poles is oriented such that directions of axes of easy magnetization are concentrated toward a stator side, and
   the current supplied from the power supply unit consists of only a trapezoidal wave in which the trapezoidal wave includes i) a rising period where a current value increases, ii) a period where the current value is a constant value, and iii) a falling period where the current value decreases.

2. The motor device according to claim 1, wherein the current has a positive current phase angle.

3. The motor device according to claim 1, wherein a position where the directions of axes of easy magnetization in the magnetic pole are concentrated is provided rearward of a central portion of the magnetic pole along a rotational direction of the rotor.

4. The motor device according to claim 1, wherein the trapezoidal wave has a de-energized period where substantially no current flows.

5. The motor device according to claim 1, wherein the trapezoidal wave has a rising period where an absolute value of a current value increases gradually and a falling period where the current value decreases gradually.

6. The motor device according to claim 5, wherein an amount of a change in current per unit angle in at least one of the rising period and the falling period is constant.

7. The motor device according to claim 1, wherein the directions of axes of easy magnetization in the plurality of magnetic poles are concentrated toward one points different from each other.

8. The motor device according to claim 1, wherein the rising period and the falling period have a same electrical angle range.

9. The motor device according to claim 1, wherein an amount of change in current per unit angle is constant in the rising period and the falling period.

* * * * *